United States Patent [19]

Willard et al.

[11] Patent Number: 4,516,996
[45] Date of Patent: May 14, 1985

[54] FORMATION OF MOLDED GLASS FIBER PARTS FROM GLASS FIBER BLANKETS AND PRODUCT

[75] Inventors: G. Fred Willard; David A. Hutchings, both of Newark, Ohio

[73] Assignee: Owens-Corning Fiberglas Corporation, Toledo, Ohio

[21] Appl. No.: 645,537

[22] Filed: Aug. 29, 1984

Related U.S. Application Data

[63] Continuation of Ser. No. 483,011, Apr. 7, 1983, abandoned.

[51] Int. Cl.$^3$ .............................................. C03C 24/02
[52] U.S. Cl. .................................... 65/3.43; 427/341; 528/162
[58] Field of Search ................. 65/3.4, 3.43; 427/340, 427/341; 528/162, 44

[56] References Cited

U.S. PATENT DOCUMENTS

| | | | |
|---|---|---|---|
| 3,008,205 | 11/1961 | Blaies et al. | 22/193 |
| 3,145,438 | 8/1964 | Koftke et al. | 22/193 |
| 3,215,585 | 11/1965 | Kneipple | 65/3.43 |
| 3,312,650 | 4/1967 | Case et al. | 260/29.3 |
| 3,639,654 | 2/1972 | Robins | 260/37 R |
| 3,734,936 | 5/1973 | Brown et al. | 260/395 B |
| 3,822,226 | 7/1974 | Taft et al. | 260/18 TN |
| 3,836,491 | 9/1974 | Taft et al. | 260/22 TN |
| 3,879,339 | 4/1975 | Richard | 260/38 |
| 3,917,558 | 11/1975 | Gardikes | 260/38 |
| 4,014,726 | 3/1977 | Fargo | 65/3.43 X |
| 4,017,461 | 4/1977 | Dunlop et al. | 260/67 R |
| 4,033,925 | 7/1977 | Anderson | 260/42.53 |
| 4,083,817 | 4/1978 | Anderson | 260/38 |
| 4,108,826 | 8/1978 | Anderson et al. | 260/395 B |
| 4,175,067 | 11/1979 | Kottke et al. | 260/30.4 R |
| 4,215,206 | 7/1980 | Hanesworth et al. | 525/441 |
| 4,311,627 | 1/1982 | Hutchings | 260/30.4 R |
| 4,320,043 | 3/1982 | Anderson | 523/144 |
| 4,366,193 | 12/1982 | Linden et al. | 427/340 |
| 4,371,648 | 2/1983 | Gardikes et al. | 523/144 |

FOREIGN PATENT DOCUMENTS 2066714 1/1980 United Kingdom .

OTHER PUBLICATIONS

New Cold Box Process is Developed, Foundry M&T, Feb. 1982, Langer et al., pp. 63–69.
Furan Polymers, Popular Science & Technology, vol. 7, (1967), pp. 432–445.

*Primary Examiner*—Robert Lindsay
*Attorney, Agent, or Firm*—Ronald C. Hudgens; Robert F. Rywalski

[57] ABSTRACT

Molded glass fiber parts are formed by depositing a phenolic resin and liquid polyisocyanate on the glass fibers as they are emitted from a fiber forming means, accumulating the glass fibers as a pack and molding the pack in contact with a tertiary amine to cure said resin and polyisocyanate and to produce a molded glass fiber part.

9 Claims, 1 Drawing Figure

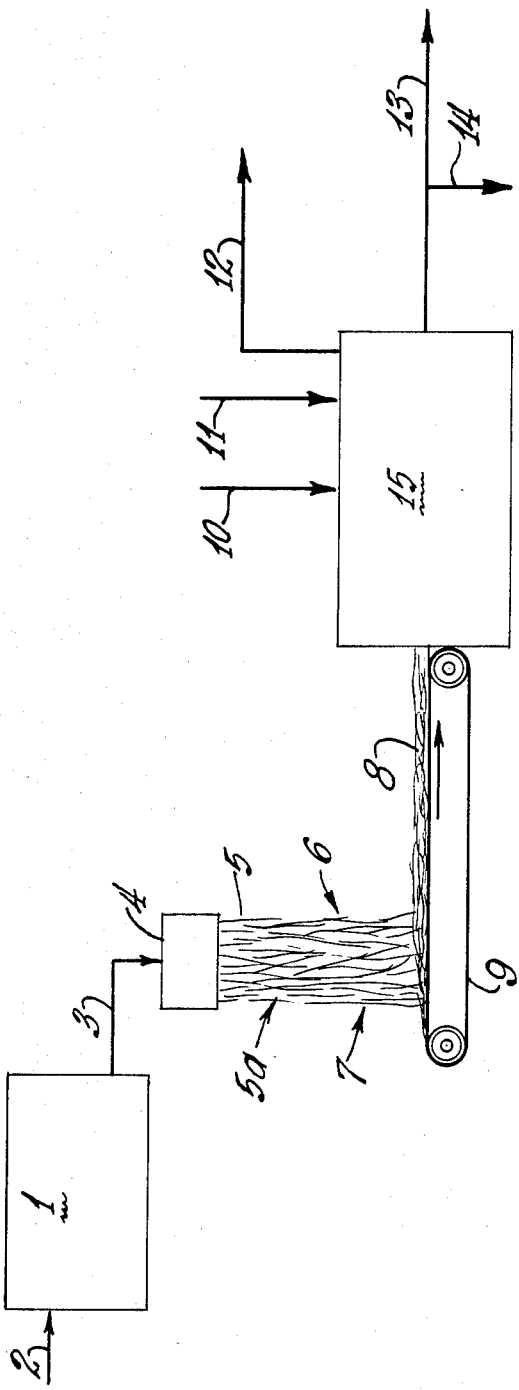

FORMATION OF MOLDED GLASS FIBER PARTS FROM GLASS FIBER BLANKETS AND PRODUCT

This is a continuation of application Ser. No. 483,011, filed on Apr. 7, 1983, now abandoned.

TECHNICAL FIELD

This invention pertains to forming glass fiber parts from glass fiber blankets.

In one of its more specific aspects, this invention pertains to an improved method of molding glass fiber parts from glass fibers collected in bat form.

BACKGROUND OF THE INVENTION

In the production of molded fiber glass parts, it is conventional practice to collect the glass fibers as bats which have a binder on their surface and to cure the binder to maintain the bats as a coherent mass. The glass bats are then molded under heat and pressure in contact with organic resins. The heat cures the resin which retains the bats in their molded form.

Such a procedure requires a considerable quantity of heat, particularly when a post-cure treatment of the molded part is necessary.

In contrast, the method of the present invention allows molding at atmospheric temperatures and eliminates post-cure treatment with the result that a considerable quantity of energy is saved.

STATEMENT OF THE INVENTION

According to the present invention, there is provided a method of forming glass fiber molded parts which comprises melting glass batch and forming fibers from the melted glass, depositing the fibers in the form of glass bats, depositing on the bats a system comprising a resin component and a hardner component and contacting the system with a curing agent and molding the bat to form a glass fiber molded part.

In the preferred embodiment of the invention, the resin component comprises an organic solvent solution of a non-aqueous phenolic resin; the hardner component comprises liquid polyisocyanate containing at least two isocyanate groups; and the curing agent comprises a tertiary amine.

More specifically, in the preferred embodiment of the invention, the phenolic resin is a resole resin, and the tertiary amine is a gaseous amine such as trimethyl amine.

DESCRIPTION OF THE INVENTION

The method of this invention can employ any type and composition of glass fiber conventionally used for forming insulation products and glass bats subsequently moldable to form head-liners, wall panels, space dividers, and the like. The fibers can have binders on their surfaces.

For purposes of illustration, the invention will be described in terms of bats composed entirely of glass fibers although mixtures of glass fibers with other materials such as polyester fibers, ceramic fibers, and the like can be employed.

Any phenolic resin which is substantially free of water and is soluble in an organic solvent can be employed. The term "phenolic resin" as employed herein is meant to define any polymeric condensation product obtained by the reaction of a phenol with an aldehyde. The phenols employed in the formation of the phenolic resin are generally all phenols which have heretofore been employed in the formation of phenolic resins and which are not substituted at either the two ortho-positions or at one ortho- and the para-position, such unsubstituted positions being necessary for the polymerization reaction. Any one, all, or none of the remaining carbon atoms of the phenol ring can be substituted. The nature of the substituent can vary widely and it is only necessary that the substituent not interfere in the polymerization of the aldehyde with the phenol at the ortho-position. Substituted phenols employed in the formation of the phenolic resins include: alkyl-substituted phenols, aryl-substituted phenols, cycloalkyl-substituted phenols, alkenyl-substituted phenols, and halogen-substituted phenols, the foregoing substituents containing from 1 to 26 and preferably from 1 to 6 carbon atoms. Specific examples of suitable phenols, aside from the preferred unsubstituted phenol, include: m-cresol, p-cresol, 3,5-xylenol, 3,4-xylenol, 2,3,4-trimethyl phenol, 3-ethyl phenol, 3,5-diethyl phenol, p-(t-butyl) phenol, 3,5-(t-butyl) phenol, p-amyl phenol, p-cyclohexyl phenol, p-octyl phenol, 3,5-dicyclohexyl phenol, p-phenyl phenol, p-crotyl phenol, 3,5-dimethoxy phenol, 3,4,5-trimethoxy phenol, p-ethoxy phenol, p-butoxy phenol, 3-methyl-4-methoxy phenol, and p-phenoxy phenol. Such phenols can be described by the general formula:

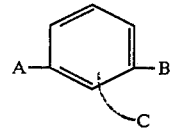

wherein A, B, and C are hydrogen, hydrocarbon radicals, oxyhydrocarbon radicals, or halogen. The preferred phenols are those which are unsubstituted in the ortho-positions. The most preferred phenol is the unsubstituted phenol, i.e., hydroxybenzene.

The aldehydes reacted with the phenol can include any of the aldehydes heretofore employed in the formation of phenolic resins such as formaldehyde, acetaldehyde, propionaldehyde, furfuraldehyde, and benzaldehyde. In general, the aldehydes employed have the formula R'CHO wherein R' is a hydrogen or a hydrocarbon radical of 1 to 8 carbon atoms. The most preferred aldehyde is formaldehyde.

The phenolic resins employed in the binder compositions can be either resole or A-stage resins or novolac resins. The resitole or B-stage resins, which are a more highly polymerized form of resole resins, are generally unsuitable. The phenolic resin employed must be liquid or organic solvent-soluble. Solubility in organic solvent is desirable to achieve the uniform distribution of the binder on the aggregate. The substantial absence of water in the phenolic resin is desirable in view of the reactivity of the binder composition of the present invention with water. The terms "non-aqueous" or "substantially water-free" as employed herein are meant to define a phenolic resin which contains less than 5% of water and preferably less than 1% of water based on the weight of the resin.

Although both the resole resins and the novolac resins can be employed in the binder compositions of the present invention, the novolac resins are preferred over the resole resins. Many resole resins are difficultly soluble in organic solvents and thus do not permit a uniform coating of the glass strands.

Furthermore, resole resins are generally prepared in aqueous media and, even on dehydration, contain 10 or more percent of water. Novolac resins generally have a more linear structure and thus are more readily soluble in organic solvents. Because of their higher molecular weight and absence of methylol groups, novolac resins can, furthermore, be more completely dehydrated. The preferred novolac resins are those in which the phenol is prevailingly polymerized through the two ortho positions. The preparation of novolac resins is known in the art and for that reason not specifically referred to herein.

Particularly preferred phenolic resins are condensation products of a phenol having the general formula:

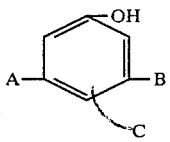

wherein, A, B, and C are hydrogen, hydrocarbon radicals, oxyhydrocarbon radicals,, or halogen, with an aldehyde having the general formula R'CHO wherein R' is a hydrogen or a hydrocarbon radical of 1 to 8 carbon atoms, prepared in the liquid phase under substantially anhydrous conditions at tempertures below about 130° C. in the presence of catalytic concentrations of a metal ion dissolved in the reaction medium. In the preferred form, these resins have the general formula:

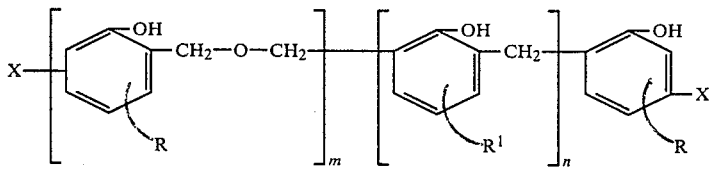

wherein R is a hydrogen or a phenolic substituent meta to the phenolic hydroxyl group, the sum of m and n is at least 2 and the ratio of m to n is at least 1, and X is an end-group selected from the group consisting of hydrogen and methylol, the molar ratio of said methylol to hydrogen end-groups being at least 1.

The phenolic resin component of the binder composition is, as indicated above, generally employed as a solution in an organic solvent. The amount of solvent used should be sufficient to result in a binder compositon permitting uniform coating thereof on the glass and uniform reaction of the mixture. The specific solvent concentrations for the phenolic resins will vary depending on the type of phenolic resins employed and its molecular weight. In general, the solvent concentrations will be in the range of up to 80% by weight of the resin solution and preferably in the range of 20 to 80%. It is preferred to keep the viscosity of the first component at less than X−1 on the Gardner-Holt Scale.

The second component or package of the novel binder composition comprises an aliphatic, cycloaliphatic, or aromatic polyisocyannate having preferably from 2 to 5 isocyanate groups. If desired, mixtures of polyisocyanates can be employed. Less preferably, isocyanate prepolymers formed by reacting excess polyisocyanate with a polyhydric alcohol, e.g. a prepolymer of toluene diisocyanate and ethylene glycol, can be employed. Suitable polyisocyanates include the aliphatic polyisocyanates such as hexamethylene diisocyanate, alicyclic polyisocyanates such as 4,4' dicyclohexylmethane diisocyanate and aromatic polyisocyanates such as 2,4- and 2,6-toluene diisocyanate, diphenylmethyl diisocyanate, and the dimethyl derivatives thereof. Further examples of suitable polyisocyanates are 1,5-naphthalene diisocyanate, triphenylmethane triisocyanate, xylene diisocyanate, and the methyl derivatives thereof, polymethylenepolyphenol isocyanates, chlorophenylene 2,4-diisocyanate, and the like. Although all polyisocyanates react with the phenolic resin to form a crosslinked polymer structure, the preferred polyisocyanates are aromatic polyisocyanates and particularly diphenylmethane diisocyanate, triphenylmethane triisocyanate and mixtures thereof.

The polyisocyanate is employed in sufficient concentrations to cause the curing of the phenolic resin. In general, the polyisocyanate will be employed in a range of 10 to 500 weight percent of polyisocyanate based on the weight of the phenolic resin. Preferably, from 20 to 300 weight percent of polyisocyanate on the same basis is employed. The polyisocyanate is employed in liquid form. Solid or viscous polyisocyanates are employed in the form of organic solvent solutions, the solvent being present in a range of up to 80% by weight of the solution.

Although the solvent employed in combination with either the phenolic rsin or the polyisocyanate or for both components does not enter to any significant degree into the reaction between the isocyanate and the phenolic resin in the presence of the curing agent, it can affect the reaction. Thus, the difference in the polarity between the polyisocyanate and the phenolic resins restricts the choice of solvents in which both components are compatible. Such compatibility is necessary to achieve complete reaction and curing of the binder compositons of the present invention. Polar solvents of either the protic or aprotic type are good solvents for the phenolic resin, but have limited compatibility with the polyisocyanates. Aromatic solvents, although compatible with the polyisocyanates, are less compatible with the phenolic resins. It is therefore preferred to employ combinations of solvents and particularly combinations of aromatic and polar solvents. Suitable aromatic solvents are benzene, toluene, xylene, ethylbenzene, and mixtures thereof. Preferred aromatic solvents are mixed solvents that have an aromatic content of at least 90% and a boiling point range within a range of 280° to 450° F. The polar solvents should not be extremely polar such as to become incompatible with the aromatic solvent. Suitable polar solvents are generally those which have been classified in the art as coupling solvents and include furfural, furfuryl alcohol, Cellosolve acetate, butyl Cellosive, butyl Carbitol, diacetone alcohol and "Texanol." Furfuryl alcohol is particularly preferred.

The binder components can be combined and then distributed throughout the glass mat in an amount within the range of from about 0.25 to about 5 weight percent.

The resulting bat with the binder components thereon is then molded into the desired shape after which the binder can be cured rapidly by contacting with a tertiary amine. The actual curing step can be accomplished by suspending a tertiary amine in an inert gas stream and passing the gas stream containing the tertiary amine, under sufficient pressure to penetrate the molded shape, through the mold until the resin has been cured. The binder compositions of the present invention require exceedingly short curing times to achieve acceptable tensile strengths, an attribute of extreme commercial importance. Optimum curing times are readily established experimentally. Since only catalytic concentrations of the tertiary amine are necessary to cause curing, a very dilute stream is generally sufficient to accomplish the curing. However, excess concentrations of the tertiary amine beyond that necessary to cause curing are not deleterious to the resulting cured product. Inert gas streams, e.g. air or nitrogen, containing from 0.01 to 5% by volume of tertiary amine can be employed. Normally gaseous tertiary amines can be passed through the mold as such or in dilute form. Suitable tertiary amines are gaseous tertiary amines such as trimethyl amine. However, normally liquid tertiary amines such as triethyl amine are equally suitable in volatile form or if suspended in a gaseous medium and then passed through the mold. Although ammonia, primary amines and secondary amines exhibit some activity in causing a room temperature reaction, they are considerably inferior to the tertiary amines. Functionally, substituted amines such as dimethyl ethanol amine are included within the scope of tertiary amines and can be employed as curing agents. Functional groups which do not interfere in the action of the tertiary amine are hydroxyl groups, alkoxy groups, amino and alkyl amino groups, ketoxy groups, thio groups and the like.

The drawing is a schematic representation of the invention.

Referring now to the attached drawing, there is shown furnace 1 into which glass batch 2 is introduced and from which molten glass 3 is withdrawn and introduced into fiber forming means 4.

Fiber forming means 4 can be a spinner from which glass fibers are produced in the form conventionally known as "wool" from which molded articles such as headliners and the like are molded.

Emitted from fiber forming means 4 are fibers 5. Upon emission, any of several applications can be made to the surface thereof. If desired, a conventionally employed binder is applied through conduit 6 for the purpose of adhering the fibers together when they are positioned as a pack on a carrier. Some portion of organic fibers can be added to the pack through conduit 5A. Or, if desired, a first application of the moldable system is made through conduit 7.

The fibers are accumulated on any suitable surface 8 from which they are transported with, or without, the addition of additional quantities of the moldable system through conduit 8.

Having been accumulated, the fibers are introduced into mold 10 which is closed to force the fibers into the shape of the article being produced. The curing agent is introduced into contact with the coated fibers through conduit 11 for a suitable period after which the mold is purged through conduit 12 and the molded shape is recovered through conduit 13 or routed to further processing through conduit 14.

It will be evident from the foregoing that various modifications can be made to the method of this invention. Such, however, are considered within the scope of the invention.

We claim:

1. A method of forming a molded glass fiber part which comprises:
   (a) melting glass batch to form molten glass;
   (b) forming glass fibers from said molten glass, said glass fibers being discharged from a spinner;
   (c) contacting the discharged fibers with a binder, a phenolic resin and a liquid polyisocyanate as the discharged fibers are descending from said spinner;
   (d) accumulating the discharged fibers in contact with the binder, a phenolic resin and a liquid polyisocyanate on a conveyor;
   (e) introducing the discharged fibers from (d) into a mold; and
   (f) contacting the fibers within the mold with a tertiary amine while molding the fibers to form a molded glass fiber part.

2. The method of claim 1 in which said phenolic resin comprises an organic solvent solution of a non-aqueous phenolic resin which comprises a condensation of a phenol having the general formula:

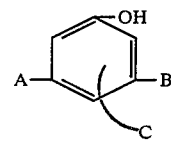

wherein A, B, and C are hydrogen, hydrocarbon radicals, oxyhydrocarbon radicals or halogen, with an aldehyde having the general formula R'CHO wherein R' is a hydrogen or hydrocarbon radical of 1 to 8 carbon atoms, said hardener component comprising liquid polyisocyanate containing at least two isocyanate groups.

3. The method of claim 1 in which said glass fibers are intermixed with organic fibers prior to the deposition of said phenolic resin and said polyisocyanate.

4. The method of claim 1 in which said polyisocyanate is an aromatic polyisocyanate.

5. The method of claim 1 in which said tertiary amine is trimethyl amine or triethyl amine.

6. The method of claim 1 in which said polyisocyanate is diphenylmethane diisocyanate.

7. A process for forming glass fiber parts comprising applying an organic solvent solution of a phenolic resin and a polyisocyanate unto glass fibers as they are emitted from a fiber forming means, accumulating said fibers and binding said accumulated fibers together by contacting said fibers, resin and polyisocynate with a vapor containing a tertiary amine curing agent at substantially room temperature whereby said resin and polyisocyanate rapidly cure at substantially room temperature to effect such binding.

8. A method of forming a glass fiber part comprising and applying an organic solvent solution of a phenolic resin and a polyisocyanate to a glass fiber batt, wherein said fibers contain a binder to maintain the batt as a coherent mass, shaping said batt into said part and binding said shaped part by rapidly curing said phenolic and polyisocyanate with a tertiary amine curing agent at substantially room temperature.

9. A cured glass fiber part comprising glass fibers bound together with a binder formed by reacting a phenolic resin and a polyisocyanate with a gas containing a tertiary amine curing agent at substantially room temperature.

* * * * *